United States Patent
Mefford, Jr. et al.

(10) Patent No.: US 8,931,037 B2
(45) Date of Patent: Jan. 6, 2015

(54) POLICY-BASED ACCESS TO VIRTUALIZED APPLICATIONS

(75) Inventors: Cread Wellington Mefford, Jr., Malden, MA (US); Matthew Christopher Babey, Brockton, MA (US); Alvin Chardon, Worcester, MA (US); Scott Elliot Stearns, Ludlow, VT (US); Adam Brady Anderson, Boston, MA (US); Lidiane Pereira de Souza, Middleton, MA (US); Angela Mele Anderson, Boston, MA (US)

(73) Assignee: Microsoft Corporation, Redmond, WA (US)

( * ) Notice: Subject to any disclaimer, the term of this patent is extended or adjusted under 35 U.S.C. 154(b) by 687 days.

(21) Appl. No.: 12/978,655

(22) Filed: Dec. 27, 2010

(65) Prior Publication Data
US 2012/0167159 A1 Jun. 28, 2012

(51) Int. Cl.
G06F 21/00 (2013.01)
G06F 9/455 (2006.01)
G06F 9/46 (2006.01)
G06F 21/12 (2013.01)
H04L 29/06 (2006.01)

(52) U.S. Cl.
CPC ............. *G06F 9/45558* (2013.01); *H04L 63/20* (2013.01); *G06F 9/468* (2013.01); *G06F 2009/4557* (2013.01); *G06F 21/121* (2013.01); *G06F 2221/2111* (2013.01)
USPC .......................................................... 726/1

(58) Field of Classification Search
None
See application file for complete search history.

(56) References Cited

U.S. PATENT DOCUMENTS

| | | | |
|---|---|---|---|
| 6,678,824 | B1 | 1/2004 | Cannon et al. |
| 6,763,370 | B1 | 7/2004 | Schmeidler et al. |
| 6,938,096 | B1 | 8/2005 | Greschler et al. |
| 7,017,188 | B1 | 3/2006 | Schmeidler et al. |
| 7,028,305 | B2 | 4/2006 | Schaefer |

(Continued)

FOREIGN PATENT DOCUMENTS

| | | |
|---|---|---|
| CN | 1330770 A | 1/2002 |
| CN | 1602636 A | 3/2005 |

(Continued)

OTHER PUBLICATIONS

Sourojit, "Monitor Application Memory Usage and Limit them", Retrieved at << http://www.blogsolute.com/monitor-application-memory-usage-and-limit-them/6485/ >>, Mar. 11, 2010, pp. 7.

(Continued)

*Primary Examiner* — Michael R Vaughan
(74) *Attorney, Agent, or Firm* — Nicholas Chen; Kate Drakos; Micky Minhas

(57) ABSTRACT

When a request is received to execute a virtualized application, an application virtualization client component evaluates an execution policy to determine if the application may be executed. If the application virtualization client component determines based on the execution policy that the virtualized application may be executed, the application virtualization client component publishes the virtualized application. The application virtualization client component publishes the application by making the virtualized application available for execution if the application is installed, and installing the virtualized application if it is not installed. The application virtualization client component also evaluates the execution policy during execution of the virtualized application. If the application virtualization client component determines that the execution policy is no longer satisfied, the application virtualization client component unpublishes the virtualized application, thereby preventing execution of the virtualized application.

20 Claims, 4 Drawing Sheets

(56) References Cited

U.S. PATENT DOCUMENTS

| | | | |
|---|---|---|---|
| 7,200,632 B1 | 4/2007 | Greschler et al. | |
| 7,225,264 B2 | 5/2007 | Croman et al. | |
| 7,328,259 B2 | 2/2008 | Srinivasan et al. | |
| 7,426,661 B2 | 9/2008 | Schaefer | |
| 7,451,451 B2 | 11/2008 | Schaefer | |
| 7,590,743 B2 | 9/2009 | Willis | |
| 7,690,039 B2 | 3/2010 | Schmeidler et al. | |
| 7,707,641 B2 | 4/2010 | Schmeidler et al. | |
| 7,730,169 B1 | 6/2010 | Greschler et al. | |
| 7,797,372 B2 | 9/2010 | Greschler et al. | |
| 8,078,713 B1* | 12/2011 | Kim | 709/223 |
| 8,272,031 B2* | 9/2012 | Abderrazzaq et al. | 726/1 |
| 2005/0080898 A1 | 4/2005 | Block | |
| 2006/0005228 A1* | 1/2006 | Matsuda | 726/1 |
| 2006/0168332 A1* | 7/2006 | Pfitzmann | 709/238 |
| 2007/0180493 A1* | 8/2007 | Croft et al. | 726/2 |
| 2008/0066148 A1 | 3/2008 | Lim | |
| 2008/0109871 A1* | 5/2008 | Jacobs | 726/1 |
| 2008/0294586 A1* | 11/2008 | Lim | 706/47 |
| 2008/0313639 A1 | 12/2008 | Kumar et al. | |
| 2009/0198769 A1* | 8/2009 | Keller et al. | 709/203 |
| 2009/0199175 A1 | 8/2009 | Keller et al. | |
| 2009/0199178 A1 | 8/2009 | Keller et al. | |
| 2009/0328225 A1* | 12/2009 | Chambers et al. | 726/26 |
| 2010/0031311 A1 | 2/2010 | Park et al. | |
| 2010/0077445 A1 | 3/2010 | Schneider et al. | |
| 2011/0113467 A1* | 5/2011 | Agarwal et al. | 726/1 |
| 2011/0208797 A1* | 8/2011 | Kim | 709/202 |
| 2012/0023189 A1* | 1/2012 | Giaretta et al. | 709/217 |
| 2012/0221955 A1* | 8/2012 | Raleigh et al. | 715/736 |
| 2013/0263210 A1* | 10/2013 | Lim | 726/1 |
| 2013/0268996 A1* | 10/2013 | Park et al. | 726/1 |

FOREIGN PATENT DOCUMENTS

| | | |
|---|---|---|
| CN | 101548284 A | 9/2009 |
| CN | 101611613 A | 12/2009 |
| CN | 101627396 A | 1/2010 |

OTHER PUBLICATIONS

"Workplace Application policy type", Retrieved at << http://publib.boulder.ibm.com/infocenter/iwphelp/v2r5m1/index.jsp?topic=%2Fcom.ibm.wcs.ic.doc_2.5.1%2Finfocenter%2Fi_wpol_c_wa_pol_type.html >>, Retrieved Date: Oct. 13, 2010, p. 1.

"Metering Application Usage with Asynchronous Event Monitoring", Retrieved at << http://technet.microsoft.com/en-us/library/ee692850.aspx >>, Retrieved Date: Oct. 13, 2010, pp. 15.

"International Search Report", Mailed—Jul. 30, 2012, Application No. PCT/US2011/066790, Filed Date Dec. 27, 2010, pp. 9.

Chinese Official Action dated Mar. 4, 2014 in Chinese Application No. 201110443200.0.

Chinese Official Action dated Oct. 17, 2014 in Chinese Application No. 201110443200.0.

* cited by examiner

US 8,931,037 B2

POLICY-BASED ACCESS TO VIRTUALIZED APPLICATIONS

BACKGROUND

Enterprises, governmental agencies, and other types of entities commonly restrict access to certain types of confidential or sensitive information. Restricting access to physical information, such as physical documents, can be easily accomplished using standard access restrictions. Restricting access to digital information, such as documents stored on a server computer, can also be accomplished relatively easily using standard security measures, such as access control lists.

Restricting the use of computer application programs ("applications") can he more difficult than restricting access to physical items, particularly when a user who is otherwise authorized to use the application must be restricted in some manner. This is especially true for organizations that issue portable computing devices to employees, such as laptop computers, tablet computers, and smartphones. Because employees have continual access to the computing devices that they have been issued, it can be difficult to restrict the use of the applications installed on the computing devices.

It is with respect to these and other considerations that the disclosure made herein is presented.

SUMMARY

Technologies are described herein for policy-based access to virtualized applications. Through an implementation of the concepts and technologies presented herein, an application virtualization environment can he provided that is capable of restricting the execution of virtualized applications according to an execution policy. The execution policy may be set by an administrator, and defines the conditions under which virtualized applications may or may not be executed. In this manner, the execution of an application can be restricted based upon various conditions, such as the geographic location of the device upon which the application is executed, the time of day or duration of use of the application, the availability of certain computing resources to the device, or other conditions.

Embodiments disclosed herein are implemented in conjunction with an application virtualization environment. In particular, an application virtualization client component is configured to provide an environment for execution of a virtualized application. The application virtualization client component also provides functionality for encapsulating the virtualized application from an underlying operating system, other application programs, and system resources. The application virtualization client component might also provide functionality for loading portions of the virtualized application by streaming needed portions of the virtualized application from an application virtualization server component.

According to another aspect, the application virtualization client component is configured to provide policy-based access to a virtualized application. In particular, when a request is received to execute a virtualized application, the application virtualization client component evaluates an execution policy to determine if the application may be executed. As discussed briefly above, the execution policy may be set by an administrator, and defines the conditions under which the virtualized application may or may not be executed. For instance, the execution policy may specify that the virtualized application may only be executed when a device executing the application is in a specified geographic area, that the application may only be executed during a specified time of day (e.g. 9 a.m. to 5 p.m.), for a specified duration each day (e.g. one hour per day), or that the application may be executed only when certain computing resources are not limited.

If the application virtualization client component determines based on the execution policy that the virtualized application may be executed, the application virtualization client component will publish the virtualized application. As utilized herein, the term "publish" means to make a virtualized application available for execution. For instance, in one embodiment, the application virtualization client application publishes the virtualized application by determining if the virtualized application is installed and, if so, makes the virtualized application available for execution. If the virtualized application is not installed, the application virtualization client component may cause the virtualized application to be streamed to the device for execution.

According to another aspect, the application virtualization client component periodically or continually evaluates the execution policy during execution of the virtualized application. If the application virtualization client component determines that the execution policy is no longer satisfied, the application virtualization client component "unpublishes" the virtualized application. For instance, the application virtualization client component may stop execution of the virtualized application and make the application unavailable for execution. The application virtualization client component might also remove the virtualized application from the client device upon which it is executing.

According to another aspect, the application virtualization client component also unpublishes the virtualized application if the execution policy cannot be evaluated. For instance, the virtualized application might be unpublished if the execution policy requires that the application only be executed within a particular geographic area, and the geographic area in which the device executing the application cannot be determined. The application virtualization client component might also store audit data regarding disallowed accesses to virtualized applications, the conditions under which applications were unpublished, and other information potentially helpful to an administrator of the application virtualization environment.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
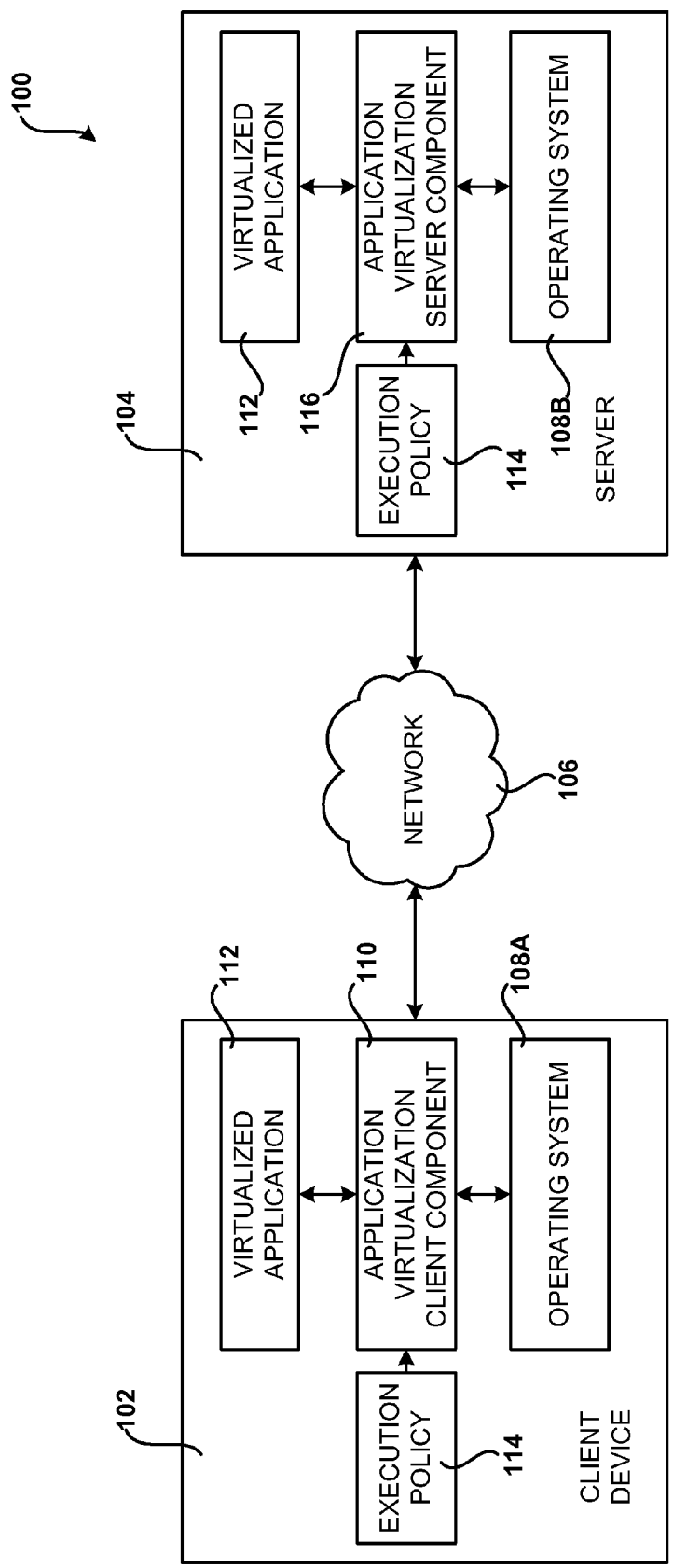
FIG. 1 is a software and network architecture diagram showing one illustrative operating environment for the embodiments disclosed herein.

The following detailed description is directed to technologies for policy-based access to virtualized applications. As discussed briefly above, an application virtualization environment is provided that is configured to enforce restrictions on the execution of a virtualized application based upon an execution policy. In particular, when a request is received to execute a virtualized application, an application virtualization client component evaluates an execution policy to determine if the application may be published and executed. If the application virtualization client component determines based on the execution policy that the virtualized application may be executed, the application virtualization client component publishes and executes the virtualized application.

The application virtualization client component publishes the application by making the virtualized application available for execution if the application is installed, and installing the virtualized application if it is not installed. The application virtualization client component also evaluates the execution policy during execution of the virtualized application. If the application virtualization client component determines that the execution policy is no longer satisfied, the application virtualization client component unpublishes the virtualized application, thereby preventing execution of the virtualized application. Additional details regarding these and other features will be provided below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for policy-based access to virtualized applications will be described.

FIG. 1 is a software and network architecture diagram showing one illustrative operating environment 100 for the embodiments disclosed herein. The illustrative operating environment 100 shown in FIG. 1 includes a client device 102 configured to communicate with a server 104 by way of the network 106. The client device 102 is a computing device configured to execute an operating system 108A and an application virtualization client component 110. The client device 102 may be a standard desktop or laptop computer, a tablet computer, a smartphone or any other type of computing device capable of performing the operations presented herein for policy-based access to virtualized applications. The client device 102 might also be a server computer configured to provide the functionality disclosed herein.

The server 104 is a computing system configured to execute an operating system 108B and the application virtualization server component 116. It should be appreciated that the server 104 may be a server computer configured to execute the application virtualization server component 110 or may comprise another type of computer system configured to perform the functionality described herein as being performed by the server 104.

The network 106 illustrated in FIG. 1 may comprise a wide area or local area network. For instance, the network 106 may be a corporate local area network, a wide area network such as the Internet, or a combination of multiple wide area and local area networks. It should be appreciated that while a single network 106 has been illustrated in FIG. 1, many other networks may be utilized. It should also be appreciated that while a single client device 102 and server 104 have been illustrated in FIG. 1, many such devices may be utilized by the embodiments disclosed herein.

As discussed briefly above, the client device 102 is configured to execute an application virtualization client component 110. The application virtualization client component 110 is a software component configured to provide an application virtualization environment. In this regard, the application virtualization client component 110 is configured to execute a virtualized application 112. The application virtualization client component 110 provides functionality for encapsulating the execution of the virtualized application 112 from the operating system 108A. The application virtualization client component 110 might also provide functionality for encapsulating execution of the virtualized application 112 from other application programs and system resources of the client device 102. For instance, the application virtualization client component 110 might virtualize resources of the operating system 108A or the client device 102. When the virtualized application 112 attempts to access the physical resources, the application virtualization client component 110 presents a virtualized resource to the application 112. In this manner, the virtualized application 112 can be executed in a manner that does not impact the actual resources exposed by the operating system 108A or the client device 102.

According to other aspects, the application virtualization client component 110 also provides functionality for loading portions of the virtualized application 112 on-demand. In particular, the application virtualization client component 110 may operate in conjunction with the application virtualization server component 116 to stream needed portions of the virtualized application 112 from the server 104 to the client device 102. In this manner, the virtualized application 112 can be accessed at the client device 102 on-demand. Moreover, because only needed portions of the virtualized application 112 may be streamed from the server 104 to the client device 102, access to the virtualized application 112 may be provided without streaming the entire application 112 from the server 104 to the client device 102.

Additional details regarding functionalities provided by the application virtualization client component 110 for encapsulating execution of the virtualized application 112 and for streaming the virtualized application 112 from the server 104 to the client device 102 can be found in U.S. Pat. No. 7,225,264 filed May 29, 2007 entitled "Systems and Methods for Delivering Content over a Computer Network," U.S. Pat. No. 7,200,632 filed Apr. 3, 2007 entitled "Method and System for Serving Software Applications to Client Computers," U.S. Pat. No. 7,451,451 filed Nov. 11, 2005 entitled "Operating System Abstraction and Protection Layer," and U.S. Pat. No. 7,797,372 tiled Sep. 14, 2010 entitled "Serving Software Applications from Servers for Client Computers," each of which is incorporated herein by reference in their entirety.

The application virtualization client component 110 is also configured to provide policy-based access to the virtualized application 112. In this regard, the server 104 and the client device 102 may store an execution policy 114. The execution policy 114 defines the conditions under which the virtualized application 112 may or may not be executed. For instance, the execution policy 114 may specify that the virtualized application 112 may only be executed when the client device 102 is within a specific geographic area. Alternately, or in combination, the execution policy 114 might also specify that the virtualized application 112 may only be executed during a specified time of day or a specified duration of time each day.

As another example, the execution policy 114 may specify that the virtualized application 112 may only be executed when certain computing resources of the client device 102 are not limited. For instance, if a certain amount of central processing unit or network bandwidth is unavailable to the client device 102, the execution policy 114 may specify that the virtualized application 112 cannot be executed. It should be appreciated that the execution policy 114 might specify other restrictions based on physical location, time, or other factors. It should also be appreciated that an administrator of the client device 102 or the server 104 may set the execution policy 114.

When a request is received at the client device 102 to execute the virtualized application 112, the application virtualization client component 110 is configured to evaluate the execution policy 114 to determine if the application 112 may be executed. In order to evaluate the execution policy 114, the application virtualization client component 110 may operate with other components in order to obtain data necessary to evaluate the execution policy 114. For instance, the application virtualization client component 110 may operate in conjunction with a software or hardware component capable of determining the physical location of the client device 102.

Illustrative technologies for identifying the location of the client device 102 include cellular triangulation, global positioning system ("GPS") location, A-GPS location, wireless signal strength-based location, wired signal strength-based location, Internet protocol address-based location determination, and others. The application virtualization client component 110 might also operate in conjunction with other types of components in order to obtain data necessary to evaluate the execution policy 114. As will be described in greater detail below, if the application virtualization client component 110 cannot obtain data necessary to evaluate the execution policy 114, execution of the virtualized application 112 may be prohibited.

It should be appreciated that, according to embodiments, evaluation of the execution policy 114 may occur at the client device 102, the server 104, or a combination of the client device 102 and the server 104. For instance, in one implementation, the application virtualization client component 110 is configured to request evaluation of the execution policy 114 by the application virtualization server component 116. If the application virtualization server component 116 is unavailable, the application virtualization client component 110 may evaluate the execution policy 114 at the client device 102. Alternately, if the application virtualization server component 116 is unavailable to evaluate the execution policy 114, the application virtualization client component 110 may prohibit execution of virtualized application 112. Alternately, the application virtualization client component 110 may be configured to evaluate the execution policy 114 at the client device 102 without any assistance from the server 104.

if the application virtualization client component 110 determines based on the execution policy 114 that the virtualized application 112 may be executed, the application virtualization client component 110 will publish the virtualized application 112 for use. As described briefly above, the term "publish" means to make the virtualized application 112 available for execution on the client device 102. For instance, in one embodiment, the application virtualization client component 110 publishes the virtualized application 112 by determining if the virtualized application 112 is installed at the client device 102. if the virtualized application 112 is installed at the client device 102, the application virtualization client component 110 makes the virtualized application 112 available for execution. If the virtualized application 112 is not installed at the client device 102, the application virtualization client component 110 may cause the virtualized application 112 to be streamed from the server 104 to the client device 102 for execution.

The application virtualization client component 110 is also configured to evaluate the execution policy 114 during execution of the virtualized application 112. For instance, the application virtualization client component 110 may periodically or continually evaluate the execution policy 114 to ensure that the execution policy 114 is being met. If the application virtualization client component 110 determines that the execution policy 114 is no longer satisfied, the application virtualization client component 110 unpublishes the virtualized application 112. For instance, the application virtualization client component 110 may stop execution of the virtualized application 112 and make the application 112 unavailable for execution. The application virtualization client component 110 might also remove the virtualized application 112 from the client device 102. If the execution policy 114 is satisfied again later, the application virtualization client component 110 may republish the virtualized application 112 by streaming the virtualized application 112 from the server 104 to the client device 102.

As discussed briefly above, the application virtualization client component 110 also unpublishes the virtualized application 112 if the execution policy 114 cannot be evaluated. For instance, the virtualized application 112 may be unpublished if the execution policy 114 requires that the application 112 only be executed within a particular geographic area and the geographic area cannot be determined by the application virtualization client component 110. If the client device 102 is later returned to the geographic area in which execution of the application 112 is permitted, the application virtualization client component 110 may republish the application 112 for execution.

According to other aspects, the application virtualization client component 110 is configured to store audit data for use by an administrator of the server 104 and the client device 102. For instance, the audit data might include data identifying disallowed accesses to the virtualized application 112, the conditions under which the application virtualization client component 110 unpublished the application 112, and other information potentially helpful to an administrator of the application virtualization environment provided by the components 110 and 116. Additional details regarding the operation of the application virtualization client component 110, the client device 102, and the server 104 will be provided below with respect to FIGS. 2A-2B.

Figure 2A:
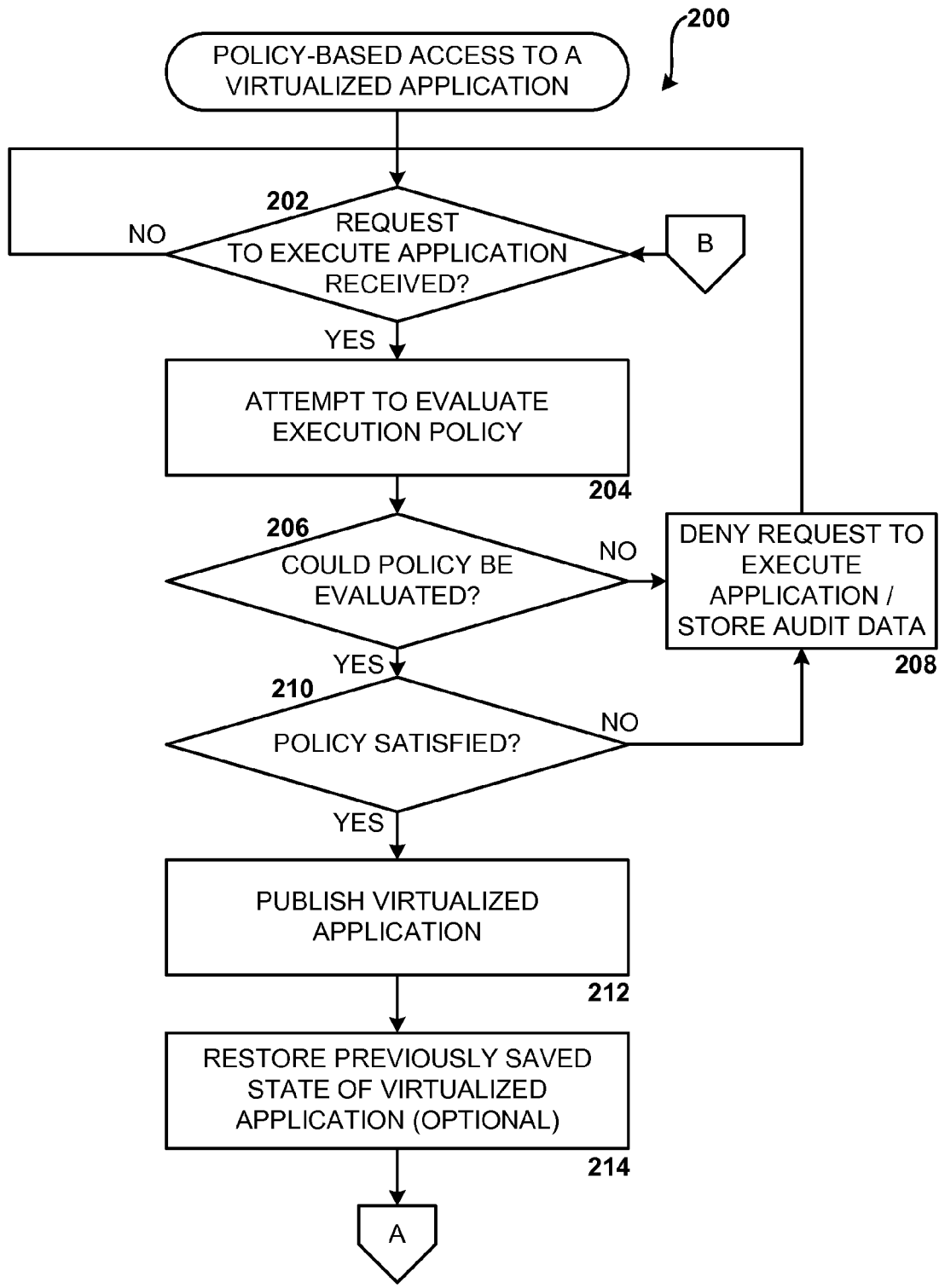
FIGS. 2A-2B are flow diagrams showing aspects of one illustrative process disclosed herein for policy-based access to virtualized applications, according to one embodiment presented herein.
Figure 2B:
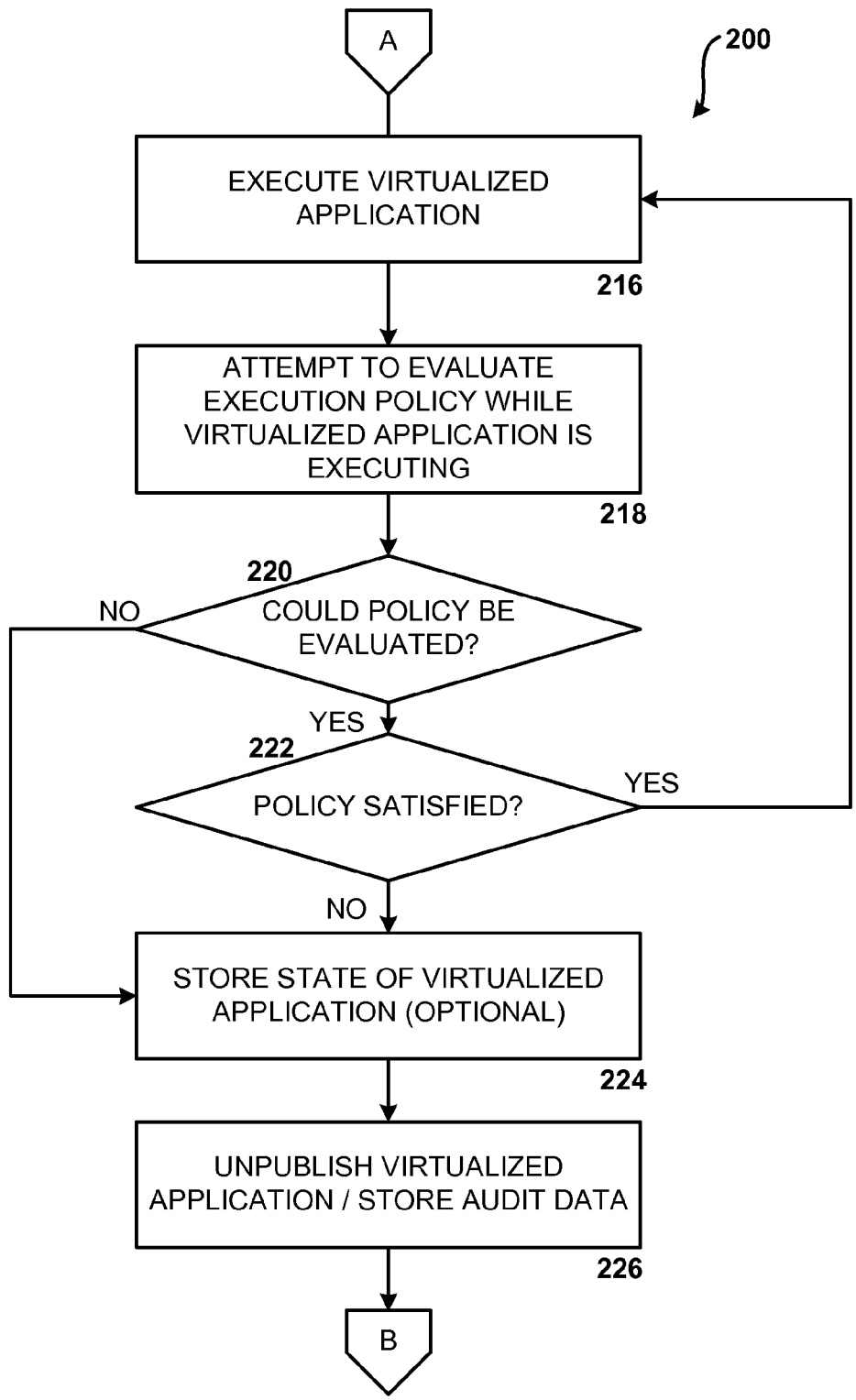

FIGS. 2A-2B are flow diagrams showing a routine 200 that illustrates aspects of one illustrative process disclosed herein for policy-based access to virtualized applications. It should be appreciated that the logical operations described herein with respect to FIGS. 2A-2B and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the application virtualization client component 110 determines whether a request has been received to execute the virtualized application 112. For instance, a user of the client device 102 may make a request to execute the application 112. If no such request has been received, the routine 200 proceeds back to operation 202 where another such determination is made. If the application virtualization client component 110 determines that a request has been received to execute the virtualized application 112, the routine 200 proceeds from operation 202 to operation 204.

At operation 204, the application virtualization client component 110 attempts to evaluate the execution policy 114. As discussed above, the application virtualization client component 110 may utilize functionality provided by other components to obtain data necessary to evaluate the execution policy 114. For instance, the application virtualization client component 110 may obtain data identifying the geographic location of the client device 102, the time of day, or other information necessary to evaluate the execution policy 114. From operation 204, the routine 200 proceeds to operation 206.

At operation 206, the application virtualization client component 110 determines whether it was capable of evaluating the execution policy 114. For instance, the application virtualization client component 110 may be unable to evaluate the execution policy 114 if data, such as the geographic location of the client device 102, is unavailable. The application virtualization client component 110 might also be unable to evaluate the execution policy 114 in other embodiments if a network connection cannot be made to the server 104. Other types of factors might also prevent the application virtualization client component 110 from evaluating the execution policy 114.

If the execution policy 114 cannot be evaluated, the routine 200 proceeds from operation 206 to operation 208. At operation 208, the application virtualization client component 110 denies the request to execute the virtualized application 112. Additionally, as discussed above, the application virtualization client component 110 ma store audit data regarding the disallowed access to the virtualized application 112, along with other information potentially helpful to an administrator of the application virtualization environment. From operation 208, the routine 200 proceeds to operation 202, described above, where another request to execute the application 112 may be processed.

If the execution policy 114 was evaluated by the application virtualization client component 110, the routine 200 proceeds from operation 206 to operation 210. At operation 210 a determination is made as to whether the execution policy 114 was satisfied. If the execution policy 114 was not satisfied, the routine 200 proceeds from operation 210 to operation 208 where the request to execute the virtualized application 112 is denied. Additionally, as described above, audit data might also be stored.

If the execution policy 114 was satisfied, the routine 200 proceeds to operation 212 where the application virtualization client component 110 publishes the virtualized application 112. As discussed above, in order to publish the application 112, the application virtualization client component 110 may determine if the application 112 is installed at the client device 102. If the application 112 is installed, the application virtualization client component 110 may make the virtualized application available for execution on the client device 102. If the virtualized application 112 is not installed at the client device 102, the application virtualization client component 110 may cause the virtualized application 112 to be streamed from the server 104 to the client device 102 for execution. Once the application 112 has been published, the routine 200 proceeds from operation 212 to operation 214.

According to one implementation, the application virtualization client component 110 may he configured to store the state of the virtualized application 112 each time the application 112 is unpublished. For instance, the application virtualization client component 110 may store the contents of memory, registers, and data describing the state of resources of the client device 102 each time the application 112 is unpublished. In this implementation, the application virtualization client component 110 may be configured to restore a previously saved state of the virtualized application 112 each time the application 112 is republished. For instance, at operation 214 of the routine 200, the application virtualization client component 110 restores the previously saved state of the virtualized application 112. In this manner, a user of the client device 102 may be presented with a virtualized application 112 upon republication that is in the same state as it was at the time the application 112 was unpublished.

From operation 214, the routine 200 proceeds to operation 216 where the application virtualization client component 110 causes the virtualized application 112 to be executed. As discussed above, the application virtualization client component 110 provides functionality for encapsulating the execution of the virtualized application 112 front the operating system 108, other application programs, and system resources. From operation 216, the routine 200 proceeds to operation 218.

At operation 218 the application virtualization client component 110 attempts to evaluate the execution policy 114 during execution of the virtualized application 112. In this manner, the application virtualization client component 110 can enforce restrictions imposed by the execution policy 114 even while the virtualized application 112 is executing.

From operation 218, the routine 200 proceeds to operation 220 where the application virtualization client component 110 determines whether it was able to evaluate the execution policy 114. For instance, as discussed above, the application virtualization client component 110 may be unable to evaluate the execution policy 114 if needed data is unable or if a connection cannot be established to the server 104.

If the execution policy 114 could be evaluated, the routine 200 proceeds from operation 220 to operation 222. At operation 222 the application virtualization client component 110 determines whether the execution policy 114 is satisfied. If so, the routine 200 proceeds from operation 222 to operation 216, described above, where execution of the virtualized application 112 continues. If the execution policy 114 is not satisfied, the routine 200 proceeds from operation 222 to operation 224. Additionally, the routine 200 proceeds from operation 220 to operation 224 if the application virtualization client component 110 is unable to evaluate the execution policy 114.

At operation 224, the application virtualization client component 110 stores the state of the virtualized application 112. As discussed above, the application virtualization client component 110 may store memory, register contents, and other information necessary to return the virtualized application 112 to its current state after republication. Once the state of the virtualized application 112 has been stored, the routine 200 proceeds to operation 226.

At operation 226 the application virtualization client component 110 unpublishes the virtualized application 112. As discussed briefly above, the application virtualization client component 110 may unpublish the virtualized application 112 by making the application 112 unavailable for execution of the client device 102. The application virtualization client component 110 might also remove the virtualized application 112 and its state from the client device 102. The virtualized application 112 may be streamed from the server 104 to the client device 102 the next time the virtualized application 112 is executed.

The application virtualization client component 110 might also store audit data at operation 226 regarding the disallowed access to the application 112, the conditions under which the application 112 was unpublished, and other information potentially helpful to an administrator of the client device 102 and the server 104. From operation 226, the routine 200 proceeds to operation 202, described above, where additional requests to the application 112 are processed in the manner described above.

Figure 3:
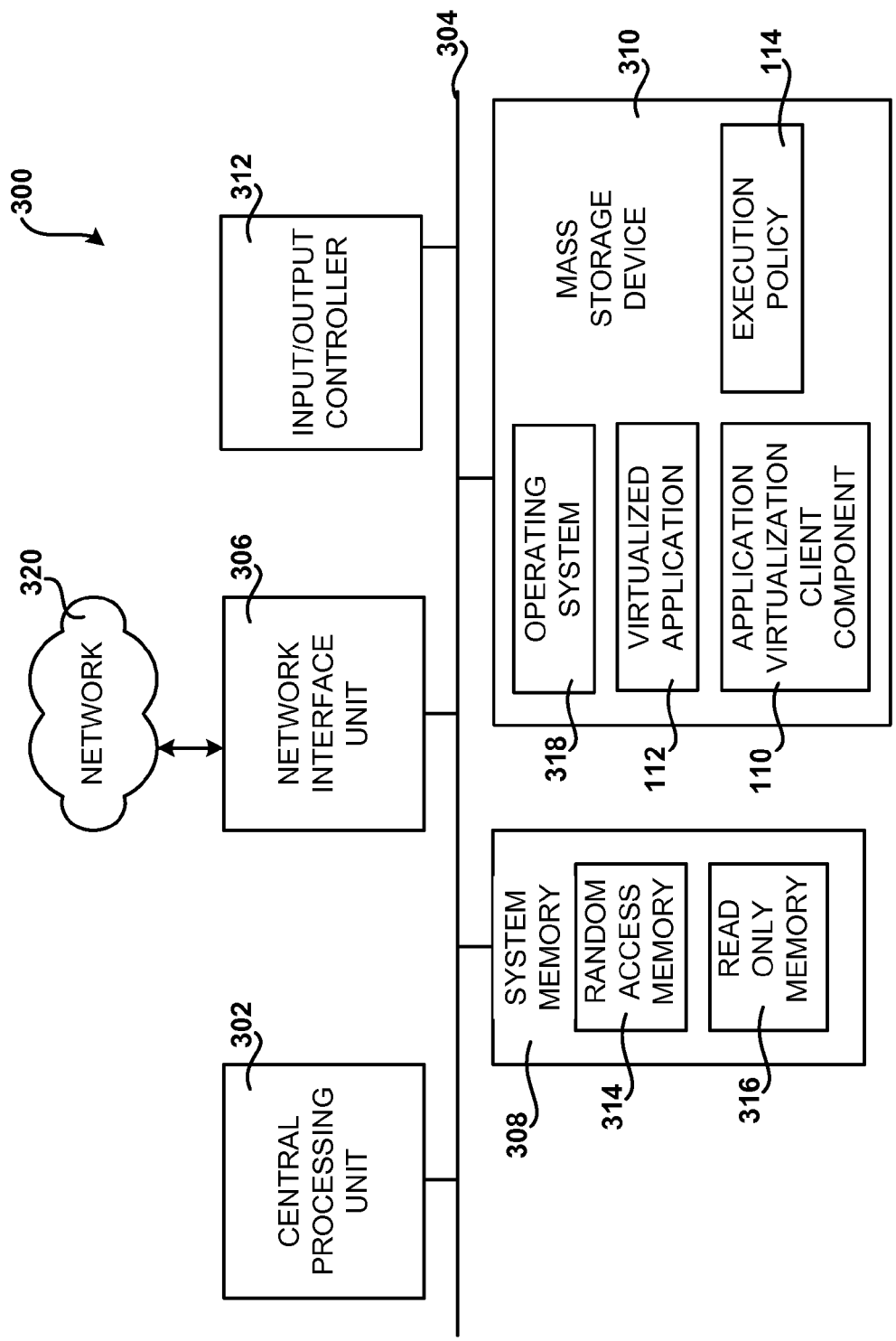
FIG. 3 is a computer architecture diagram showing an illustrative computer hardware and software architecture for a computing system capable of implementing the various embodiments presented herein.

FIG. 3 is a computer architecture diagram showing an illustrative computer hardware and software architecture for a computing system capable of implementing the various embodiments presented herein. The computer architecture shown in FIG. 3 illustrates a conventional desktop, laptop computer, or server computer and may be utilized to execute the various software components described herein.

The computer architecture shown in FIG. 3 includes a central processing unit 302 ("CPU"), a system memory 308, including a random access memory 314 ("RAM") and a read-only memory ("ROM") 316, and a system bus 304 that couples the memory to the CPU 302. A basic input/output system ("BIOS") containing the basic routines that help to transfer information between elements within the computer 300, such as during startup, is stored in the ROM 316. The computer 300 further includes a mass storage device 310 for storing an operating system 318, application programs, and other program modules, which will be described in greater detail below.

The mass storage device 310 is connected to the CPU 302 through a mass storage controller (not shown) connected to the bus 304. The mass storage device 310 and its associated computer-readable storage media provide non-volatile storage for the computer 300. Although the description of computer-readable media contained herein refers to a mass storage device, such as a hard disk or CD-ROM drive, it should be appreciated by those skilled in the art that computer-readable storage media can be any available computer storage media that can be accessed by the computer 300.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 300.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 300 may operate in a networked environment using logical connections to remote computers through a network such as the network 320. The computer 300 may connect to the network 320 through a network interface unit 306 connected to the bus 304. It should be appreciated that the network interface unit 306 may also be utilized to connect to other types of networks and remote computer systems. The computer 300 may also include an input/output controller 312 for receiving and processing input from a number of other devices, including a keyboard, mouse, or electronic stylus (not shown in FIG. 3). Similarly, an input/output controller may provide output to a display screen, a printer, or other type of output device (also not shown in FIG. 3).

As mentioned briefly above, a number of program modules and data files may be stored in the mass storage device 310 and RAM 314 of the computer 300, including an operating system 318 suitable for controlling the operation of a networked desktop, laptop, or server computer. The mass storage device 310 and RAM 314 may also store one or more program modules. In particular, the mass storage device 310 and the RAM 314 may store the virtualized application 112, the application virtualization client component 110, and/or the other software components described above. The mass storage device 310 and RAM 314 may also store other program modules and data, such as the execution policy 114.

In general, software applications or modules may, when loaded into the CPU 302 and executed, transform the CPU 302 and the overall computer 300 from a general-purpose computing system into a special-purpose computing system customized to perform the functionality presented herein. The CPU 302 may be constructed from any number of transistors or other discrete circuit elements, which may individually or collectively assume any number of states. More specifically, the CPU 302 may operate as one or more finite-state machines, in response to executable instructions contained within the software or modules. These computer-executable instructions may transform the CPU 302 by specifying how the CPU 302 transitions between states, thereby physically transforming the transistors or other discrete hardware elements constituting the CPU 302.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for policy-based access to virtualized applications have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising performing computer-implemented operations for:
   receiving a request to execute a virtualized application on a device;
   in response to receiving the request, attempting to evaluate an execution policy for the virtualized application to determine if the virtualized application may be executed on the device;
   determining whether the execution policy can be evaluated;
   unpublishing the virtualized application from the device by removing the virtualized application from the device in response to determining that the execution policy cannot be evaluated; and
   publishing the virtualized application in response to determining that the execution policy can be evaluated and that the virtualized application may be executed.

2. The computer-implemented method of claim 1, wherein the execution policy specifies that the virtualized application may only be executed during a specified period of time.

3. The computer-implemented method of claim 1, wherein the execution policy specifies that the virtualized application may only be executed for a specified duration.

4. The computer-implemented method of claim 1, wherein the execution policy specifies that the virtualized application may only be executed when computing resources utilized by the device executing the virtualized application are not limited.

5. The computer-implemented method of claim 1, wherein publishing the virtualized application comprises:
   determining whether the virtualized application is installed at the device;
   making the virtualized application available for execution if the virtualized application is installed at the device; and
   streaming the virtualized application to the device if the virtualized application is not installed at the device.

6. The computer-implemented method of claim 5, further comprising:
   evaluating the execution policy during execution of the virtualized application to determine if the virtualized application may continue to be executed; and
   unpublishing the virtualized application in response to determining that the virtualized application may not continue to be executed.

7. The computer-implemented method of claim 1, further comprising:
   determining if an application virtualization server component is available to evaluate the execution policy;
   evaluating the execution policy at the application virtualization server component in response to determining that the application virtualization server component is available; and
   evaluating the execution policy at the device executing the virtualized application if the application virtualization server component is unavailable to evaluate the execution policy.

8. The computer-implemented method of claim 7, further comprising storing audit data comprising data describing one or more conditions under which the virtualized application was unpublished.

9. The computer-implemented method of claim 1, wherein unpublishing the virtualized application comprises stopping execution of the virtualized application and storing a state of the virtualized application.

10. The computer-implemented method of claim 9, further comprising:
    determining, based on the execution policy, that the virtualized application may be executed; and
    republishing the virtualized application in response to determining that the virtualized application may be executed by restoring the state of the virtualized application.

11. A computer-readable storage medium having computer-executable instructions stored thereupon which, when executed by a computer, cause the computer to:
    receive a request to execute a virtualized application;
    attempt to evaluate an execution policy for the virtualized application to determine if the virtualized application may be executed in response to receiving the request;
    determine whether the execution policy can be evaluated;
    unpublish the virtualized application by removing the virtualized application in response to determining that the execution policy cannot be evaluated; and
    publish the virtualized application in response to determining that the execution policy can be evaluated and that the virtualized application may be executed.

12. The computer-readable storage medium of claim 11, having further computer-executable instructions stored thereon which, when executed by the computer, cause the computer to:
    evaluate the execution policy during execution of the virtualized application to determine if the virtualized application may continue to be executed; and to
    unpublish the virtualized application in response to determining that the virtualized application may not continue to be executed.

13. The computer-readable storage medium of claim 11, wherein publishing the virtualized application comprises:

determining whether the virtualized application is installed at a device;

making the virtualized application available for execution if the virtualized application is installed at the device; and streaming the virtualized application to the device if the virtualized application is not installed at the device.

14. The computer-readable storage medium of claim 13, wherein the execution policy specifies that the virtualized application may only be executed during a specified period of time or that the virtualized application may only be executed for a specified duration.

15. The computer-readable storage medium of claim 13, wherein the execution policy specifies that the virtualized application may only be executed when computing resources utilized by the device executing the virtualized application are not limited.

16. The computer-readable storage medium of claim 11, having further instructions stored thereupon which, when executed by the computer, cause the computer to:
   determine if an application virtualization server component is available to evaluate the execution policy;
   evaluate the execution policy at the application virtualization server component in response to determining that the application virtualization server component is available; and
   evaluate the execution policy at the device executing the virtualized application if the application virtualization server component is unavailable to evaluate the execution policy.

17. The computer-readable storage medium of claim 16, having further instructions stored thereupon which, when executed by the computer, cause the computer to store audit data comprising data describing one or more conditions under which the virtualized application was unpublished.

18. The computer-readable storage medium of claim 11, wherein unpublishing the virtualized application comprises stopping execution of the virtualized application and storing a state of the virtualized application.

19. The computer-readable storage medium of claim 18, having further instructions stored thereupon which, when executed by the computer, cause the computer to:
   determine, based on the execution policy, that the virtualized application may be executed; and
   republish the virtualized application in response to determining that the virtualized application may be executed by restoring the state of the virtualized application.

20. A computer-readable storage medium having computer-executable instructions stored thereupon which, when executed by a computer, cause the computer to:
   receive a request to execute a virtualized application on a device;
   in response to receiving the request, attempting to evaluate an execution policy for the virtualized application to determine if the virtualized application may be executed on the device;
   determine whether the execution policy can be evaluated;
   unpublish the virtualized application from the device by removing the virtualized application from the device in response to determining that the execution policy cannot be evaluated; and to
   publish the virtualized application by streaming the virtualized application to the device in response to determining that the execution policy can be evaluated and that the virtualized application may be executed, and wherein the execution policy specifies that the virtualized application may only be executed when the device is located in a specified geographical location.

* * * * *